Nov. 15, 1949  R. F. DAVIS  2,488,491
WELL LOGGING NULL RECORDER
Filed July 19, 1946
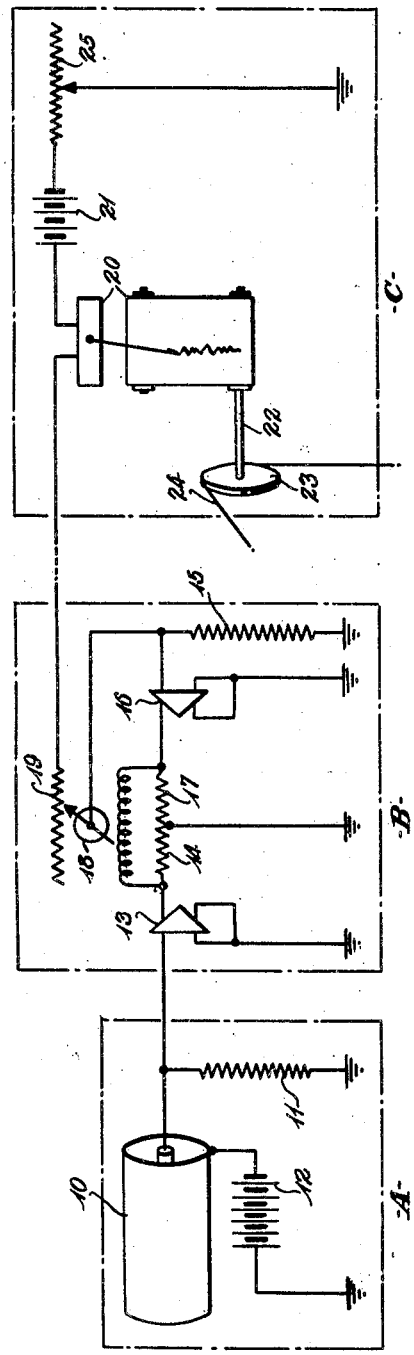
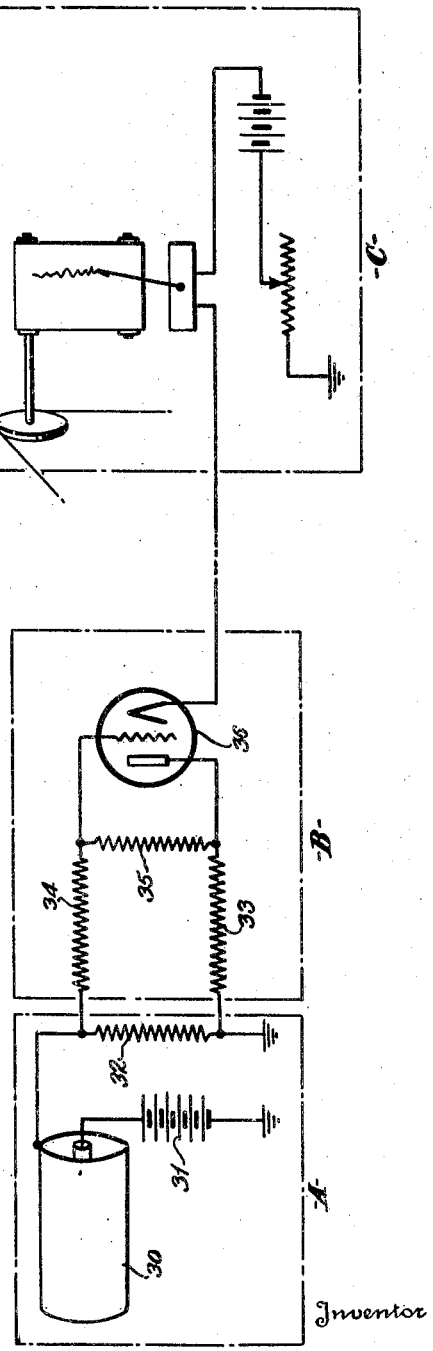
Inventor
Robert F. Davis
By James Y. Cleveland
Attorney Patented Nov. 15, 1949

2,488,491

UNITED STATES PATENT OFFICE 2,488,491

WELL LOGGING NULL RECORDER

Robert F. Davis, Falls Church, Va., assignor to Well Surveys, Incorporated, Tulsa, Okla., a corporation of Delaware Application July 19, 1946, Serial No. 684,762

1 Claim. (Cl. 346—39)

This invention relates to the art of making measurements and particularly the art of making accurate measurements under conditions that require the phenomena being measured to be observed in one locality and the measurement to be recorded in a different locality. The invention has particular applicability to the art of well logging, in which the phenomena are observed deep within a drillhole and the measurements recorded at the surface.

Prior to this invention, measurements have been made within drillholes, the measurements translated into electrical impulses, the electrical impulses transmitted to the surface of the earth and there recorded. This procedure has not been entirely satisfactory because of the errors introduced in translating the measurements into electrical impulses and in conveying these impulses to the surface of the earth for recording.

One method of avoiding many of the difficulties attendant to the translation of measurements to electrical impulses and the transmitting of the impulses to the surface of the earth, is described in United States Patent No. 2,349,225, granted to S. A. Scherbatskoy et al. on May 16, 1944. According to the method and apparatus there disclosed, a null system is provided for making the desired measurements.

In the Scherbatskoy et al. system, the phenomena to be measured are caused to control the potential developed across a resistor positioned closely adjacent the observation point. This potential is matched by a potential developed across a second or nulling resistor, also closely adjacent the observation point, as a result of current supplied from the distant point where the recording is performed. Any difference in potentials across the two resistors is used to operate an amplifier, adjacent the observation point, and the output of this amplifier is transmitted to the recording point and there used to control the current flow in the nulling circuit.

Since the potential across the nulling resistor is directly dependent upon the current flow through it, a measure of the current flow to the nulling resistor is an accurate indication of the potential in the primary resistor and hence of the phenomena to be measured as indicated by the potential across the primary resistor. Thus the usual variations in the operation of the amplifier only affect the rate of response to a minor extent and do not introduce errors into the measurement being made.

The present invention is an improvement upon that of Scherbatskoy et al. In accordance with the present invention, as in the Scherbatskoy et al. patent, the phenomena to be measured are caused to control a potential which is compared with another potential developed across a nulling resistor and the current required to develop an equal potential across the nulling resistor is recorded as a measure of the phenomena under observation. Unlike the Scherbatskoy et al. system, however, the amount of current in the nulling circuit is controlled, not at the point of recording, but at the point where the phenomena are being observed. This, according to the present invention, has been found to greatly simplify the entire measuring and recording circuit and also to avoid the necessity of sending several currents between the point of observation and the point of recording.

Simply stated, the present invention comprises the creation, at the observation point, of a potential proportional to the phenomena being measured, and the matching of that potential by a second potential, also at the observation point, created by a current which passes between the observation and recording points, the matching being accomplished by means of a circuit located at the observation point which compares the two potentials and adjusts the current accordingly.

For a detailed understanding of the principles of this invention, reference may be had to the appended drawings in which:

Figure 1 is a diagrammatic illustration of one embodiment thereof, and

Figure 2 is a diagrammatic illustration of a somewhat different embodiment.

As illustrated in Figure 1, the principles of this invention have been applied to a device for measuring gamma radiations in an oil well. Thus, the observing or detecting circuit A is comprised of an ionization chamber 10, the central electrode of which is connected by a relatively high resistance 11 to ground, and the outer or pail electrode of which is connected through a battery 12 to ground. By this arrangement a potential is developed across the resistor 11 which is proportional to the current flow across the electrodes of the ionization chamber 10 and hence proportional to the gamma radiations being measured.

The electrometer circuit, which is shown as section B of the instrument as shown in the drawing, is located in the capsule that encloses the part of the instrument lowered into the well and hence is always positioned at, or closely adjacent to, the point of observation.

In this section of the instrument the potential developed across the resistor 11 is amplified by an amplifier 13 and grounded through a resistor 14. In this same section of the device another current, which shall be called a nulling current, is passed through a nulling or balancing resistor 15 and the potential drop across this resistor is amplified by a similar amplifier 16 and passed through a resistor 17 to ground.

By constructing the two amplifiers 13 and 16 to be as nearly alike as possible and by using resistors 14 and 17 in their output circuits which have the same resistance, the undgrounded ends of these two resistors will have the same potential if the potential is the same across the detecting or observing circuit resistor 11 and the nulling resistor 15. If the potential difference across these two resistors is different, however, a potential difference will exist between the ungrounded ends of the amplifier output resistors 14 and 17 and the direction of this difference will depend upon the direction of the difference in potentials across the measuring cir uit resistor 11 and the nulling resistor 15. By connecting the driving coils of a small reversible motor 18 between the ungrounded ends of the output resistors 14 and 17, this motor can be caused to be driven in one direction or the other depending upon the direction of unbalance in the circuit, whenever the circuit is unbalanced. This small motor 18 can then be used to operate a variable resistor 19 which variable resistor can be placed in series with the nulling resistor 15 so as to control the current therethrough and automatically effect a balancing of the potentials across the measuring circuit resistor 11 and the nulling resistor 15.

The circuit which includes the nulling resistor 15 and the variable resistor 19 is caused to extend to the surface of the earth where it includes, as shown in section C of the drawing, a recording ammeter 20 and a source of potential 21.

Preferably, the tape of the recording ammeter 20 is driven through some suitable connection 22 from a pulley 23 over which the cable 24 passes to support the exploring capsule in the well. This causes the record of current to be plotted against the depth at which the measurement is being made and so produces a running log of the well being investigated.

Also in series with the other elements of the nulling circuit there may desirably be a variable resistance 25 at the surface of the earth, the purpose of this variable resistance being to adjust the resistance in the nulling circuit so as to keep the current within the range of control of the variable resistance 19 in the well. By the use of the variable resistance 25 on the surface, the functioning of the instrument in the well may be easily checked at any time. This may be done by simply holding the surveying capsule at any given point and varying the resistance on the surface. If the variable resistance on the surface can be varied over a fair range without varying the current flow as indicated on the recorder, it is evident that the nulling circuit in the well is compensating for the variations in resistance of the surface resistor and therefore is operating. If a variation in the variable resistance 25 on the surface varies the current indicated by the recorder, it is immediately apparent that the nulling circuit in the well is not able to compensate for the variation in the surface resistor and hence is not functioning properly.

While the source of power for the nulling circuit has been shown as a battery positioned at the surface of the earth, it will be evident that this battery can be positioned in the well if so desired, but since it is not necessary to position it in the well it will generally be found more desirable to position it on the surface.

In constructing the device illustrated, the amplifiers 13 and 16 may be constructed in accordance with the principles set forth by Lee A. DuBridge and Hart Brown, in "Review of Scientific Instruments," 4, 532, 1933. Such circuits provide a very stable arrangement for amplifying direct currents and can be used to advantage in an arrangement such as the one here described. Additional stages of power amplification may be added if and as necessary to obtain the necessary power output to operate the reversible motor 18.

In Figure 2, there is illustrated a modified circuit, in accordance with this invention, which circuit avoids the use of a motor-driven potentiometer, and controls the flow of current in the nulling circuit by the use of a thermionic tube in lieu thereof.

The circuit of Figure 2, like that of Figure 1, consists of three sections A, B and C. Sections A and B of the circuit, which comprise the ionization chamber circuit and electrometer circuit, are normally located at one place, for example in the bore of an oil well, and section C of the circuit, which is the recorder circuit, is normally located in a distant place, for example, at the surface of the earth.

The ionization chamber circuit comprises an ionization chamber 30 the central electrode of which is connected to the positive pole of a battery 31, the negative pole of which is grounded. The outer electrode of the ionization chamber is connected through an ionization chamber resistor 32 to ground. In accordance with the usual practice, the ionization chamber resistor 32 has a resistance of the order of $10^9$ to $10^{12}$ ohms so as to develop an appreciable voltage across it.

The electrometer circuit comprises a nulling resistor 33, one end of which is grounded, and a pair of secondary resistors 34 and 35 connected in series between the ungrounded ends of the ionization chamber resistor 32 and the nulling resistor 33. Thus, the four resistors form a bridge circuit.

Current is supplied to the ungrounded end of the nulling resistor 33 through a thermionic tube 36, the filament of which is connected to the recording apparatus (section C) on the surface of the earth, and the plate of which is connected to the ungrounded end of the nulling resistor 33. The control grid of the thermionic tube 36 is connected to a point between the two secondary resistors 34 and 35 and the two secondary resistors are of such resistance as to properly bias the control grid of the thermionic tube and at the same time avoid any appreciable loss of current through them from the ionization chamber resistor.

In operation, with a negative potential supplied to the filament of the thermionic tube 36, with respect to ground, the thermionic tube 36 will pass sufficient current to effect a balance between the potential developed across the nulling resistor 33 and across the ionization chamber resistor 32. At any time that the current through the ionization chamber resistor 32 increases, and therefore the ungrounded end of this resistor becomes more positive, the grid of the thermionic tube 36 will also become more positive and the thermionic tube 36 will pass more current, which will in turn cause more current to pass through the nulling resistor 33, thus causing the ungrounded end of the nulling resistor 33 to become more negative until a balance is reached.

The surface equipment (section C), is the same as in Figure 1 and therefore need not be again described.

The thermionic tube 36 may be of the type manufactured by the General Electric Company of Schenectady, New York and designated as an "F. P.-54" and it may be connected in the circuit in accordance with the principles set forth by Lee A. DuBridge and Hart Brown in "Review of Scientific Instruments," 4, 532, 1933, or in accordance with the recommendations of the General Electric Co. Alternatively, the thermionic tube may be one of the type manufactured by the Victoreen Instrument Company of Cleveland, Ohio, and designated as "VX-41" and this tube may either be connected as recommended by the company or as suggested by Lee A. DuBridge and Hart Brown in the article, above mentioned, except for the necessary adaptations to make the DuBridge-Brown circuit operate satisfactorily with such a thermionic tube. These types of thermionic tubes are mentioned merely as examples and other thermionic tubes of higher current handling capacity may often be used to advantage, the resistance of the nulling resistor 33, being correspondingly lower and the current in the nulling circuit being correspondingly higher.

In the drawings and the foregoing description thereof, the thermionic tube 36 has been shown simply as a three-element tube, but it is to be understood that this is done merely for the purpose of simplification and that in actual practice it will usually be desirable to use a thermionic tube containing at least four elements. The manner of connecting such tubes is well known, however, and will not be described in detail.

What is claimed is:

In a geophysical exploration device, an instrument sensitive to phenomena characteristic of earth formations surrounding a bore hole and comprising a capsule to be lowered into a bore hole, said capsule containing an electrical element the impedance of which is sensitive to the presence of the phenomena to be measured, a circuit including said element and a source of constant electrical potential, said circuit having an output voltage varying in proportion to the magnitude of the phenomena to be measured, a comparator within said capsule connected to receive the voltage output of said circuit, a second source of constant electrical potential connected to said comparator, said comparator including a variable resistance for varying the current output of said second constant potential source in accordance with any difference in magnitude between the output voltage of said electrical circuit and a voltage developed in the comparator by the current supplied thereto by the second source of constant potential, and a recording device located at the surface of the earth, connected to said second source of potential, and directly responsive to the magnitude of the current flowing from said second source of constant potential as controlled in accordance with the comparison of voltages by said comparator, for recording the magnitude of the phenomena to be measured.

ROBERT F. DAVIS.

REFERENCES CITED

The following references are of record in the file of this patent:

UNITED STATES PATENTS

| Number | Name | Date |
|---|---|---|
| 1,972,141 | Gilbert | Sept. 4, 1934 |
| 2,011,315 | Gilbert | Aug. 13, 1935 |
| 2,219,274 | Scherbatskoy | Oct. 22, 1940 |
| 2,358,103 | Ryder | Sept. 12, 1944 |
| 2,366,618 | Harrison | Jan. 2, 1945 |